Dec. 3, 1968  D. PETZOLD  3,414,719
MULTIPLE-STAGE STATIC COUNTER HAVING MAIN AND AUXILIARY STORES
Filed Jan. 18, 1965  9 Sheets-Sheet 1
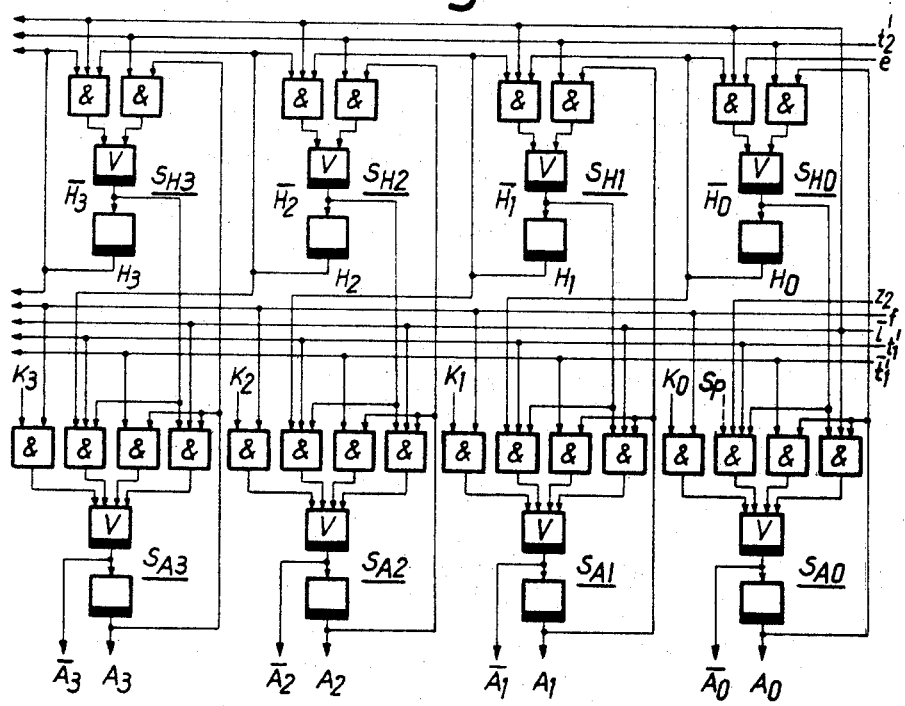
*Fig. 1a*
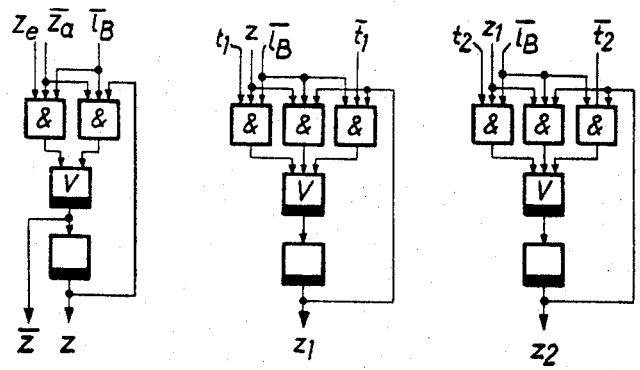
*Fig. 10a*  *Fig. 10b*  *Fig. 10c*
Inventor:
Dieter Petzold
By: Spencer & Hays
Attorneys Dec. 3, 1968     D. PETZOLD     3,414,719

MULTIPLE-STAGE STATIC COUNTER HAVING MAIN AND AUXILIARY STORES

Filed Jan. 18, 1965     9 Sheets-Sheet 5

Inventor:
Dieter Petzold
By: Spencer & Kaye
Attorneys

Inventor:
Dieter Petzold
By: Spencer & Kaye
Attorneys

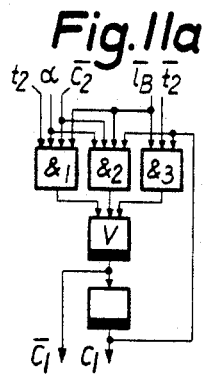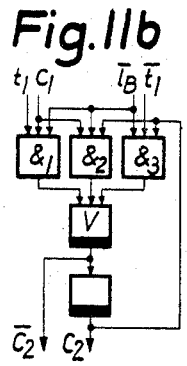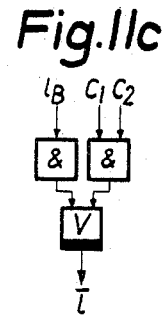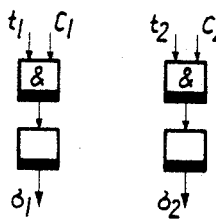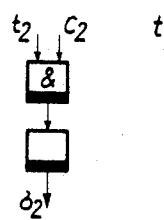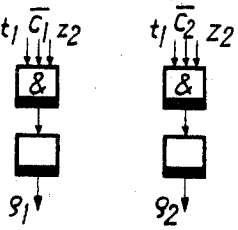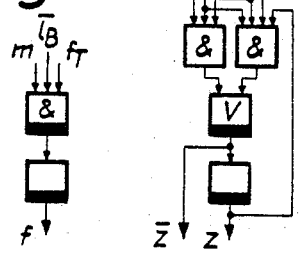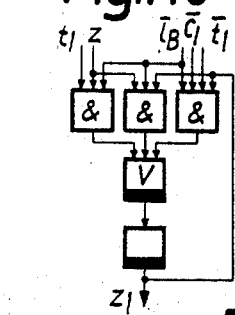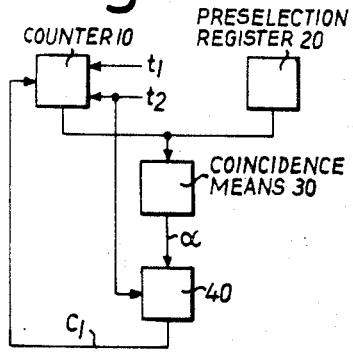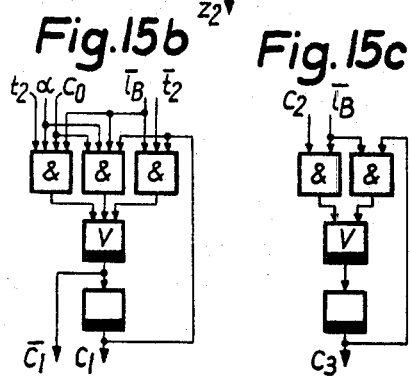

United States Patent Office 3,414,719
Patented Dec. 3, 1968

3,414,719
MULTIPLE-STAGE STATIC COUNTER HAVING MAIN AND AUXILIARY STORES
Dieter Petzold, Berlin-Neukolln, Germany, assignor to Licentia Patent-Verwaltungs-G.m.b.H., Frankfurt am Main, Germany
Filed Jan. 18, 1965, Ser. No. 426,003
Claims priority, application Germany, Jan. 16, 1964, L 46,821
23 Claims. (Cl. 235—92)

ABSTRACT OF THE DISCLOSURE

A counting arrangement in which a multiple-stage static counter, each of whose stages has a main store and an auxiliary store, is controlled by timely staggered counting signals and auxiliary counting signal which are applied to the main and auxiliary stores, respectively. A coincidence circuit is connected to the static counter and to a preselection register which is capable of receiving a preselected number, which coincidence circuit produces a coincidence signal that is present so long as the count of the counter is the same as the preselected number written into the preselection register. Means are connected to the coincidence circuit for deriving from it a timely displaced signal which appears when both the coincidence signal and an auxiliary counting signal are present. The thus-derived signal is effective to reset the counter and/or to interrupt the counting operation of the counter.

---

The present invention relates to static counters and, more particularly, to static counters incorporating a preselection feature.

In the computer and data processing art, counters are frequently called upon to form signals, and also to sort out or to suppress certain signals in a sequence of signals, after the counter has counted to a preselected number, or after a preselected number of steps. Accordingly, the present invention relates to counters which incorporate such a preselection feature.

Static counters are made up of static memory or storage devices. These storage devices are in the form of logic circuits in which the condition or state of the output signal is determined exclusively from the combination of states of the input signals and the fed back output signal, the form of the signal being any desired shape. If one input signal changes, the new output state is derived from the output state prevailing up to then and from the new input states. The manner in which this change occurs, i.e., the steepness of the slope of the flank of the signal, has no influence. The circuit is controlled by voltage signals which have assigned to them either of the two binary values 0 and L, the character "L" being used to represent the binary "1." Whether a signal is to be considered a 0-signal or an L-signal depends solely on its amplitude.

For purposes of explanation, reference will be made to the static counter shown in co-pending application Ser. No. 327,585, filed Nov. 29, 1963, two embodiments of which are depicted in FIGURES 1a and 1b of the accompanying drawings. FIGURE 1a shows the first four counter stages of a binary counter and FIGURE 1b shows the first four counter stages of a decimal counter, these first four stages of the decimal counter constituting the 0th decade. The counters are made of identical counter stages, each incorporating a main storage unit, i.e., a memory unit referred to simply as a main store $S_A$ and an auxiliary store $S_H$. Each store is identified by an appropriate subscript, e.g., $S_{A1}$, $S_{H2}$, and in the case of the stores of the decimal counter, by appropriate superscripts, e.g., $S_{A3}{}^0$, $S_{H2}{}^0$, identifying the decade. The stores are constituted by input AND-circuits whose inputs are connected to OR/NOT/NOT-circuits. All of the stores are galvanically coupled to each other. The configuration or wave shape of the applied input signals is of no consequence; all that is necessary is that the input signals have certain predetermined amplitudes.

There will now be described the operation of the counters as well as the significance of the various signals.

Each counter has applied to the actual counting signals $t_1$ as well as auxiliary counting signals $t_2$, the signals $t_1$ and $t_2$ being staggered or time-shifted with respect to each other, i.e., the signals $t_1$ and $t_2$ occur at different times and, as shown graphically in FIGURE 2a, there are time intervals between the signals $t_1$ and $t_2$. The signals themselves, as well as the time intervals therebetween, may be of different durations. If the timed relationship between the signals $t_1$ and $t_2$ is as depicted in FIGURE 2b, $t_2$ can be used as the counting signal and $\bar{t}_1$ as the auxiliary counting signal. If the timed relationship between the signals $t_1$ and $t_2$ is as shown in FIGURE 2c, two AND-circuits can be used for producing two signals ($t_1$ and $\bar{t}_2$) and ($\bar{t}_1$ and $t_2$) which are staggered with respect to each other and between which there is a time interval. The repeated disappearance and reappearance of the $t$-signals—as depicted in FIGURE 2d and as might be produced by shocks or vibrations to which the pulse generator is subjected—will not adversely influence the operation. The signal trains identified in FIGURE 2d at $a_1'$ will each be considered, by the counter, as one counting signal, comparable to the signals $a_1$ of FIGURE 2a. The same applies to the signal trains $b_1'$, each of which will be considered by the counter as an auxiliary counting signal.

The A-signals represent the number of counting signals $t_1$ registered by the counter. The H-signals are auxiliary signals which are formed by the counter itself and which assist the function of the counter. As explained above, the A-signals and H-signals of the binary counter are identified by subscripts, while the A-signals and H-signals of the decimal counter are identified by subscripts and superscripts. The signal $A_1$ of the binary counter has the value $2^i$, while the signal $A_i{}^j$ of the decimal counter has the value $2^i \cdot 10^j$.

Before the start of a counting operation, the counter is put into a definite starting position by means of an erase or reset signal $1=L$. During the counting operation, the reset signal $1=0$. For purposes of simplification, those signals which in each counter stage together act on one AND-stage, are separately combined. The counters therefore have applied to them $t'$ signals which are derived from the $t$-signals and the negated reset signal $\bar{1}$ by means of the circuits shown in FIGURES 8a, 8b and 8c. The $e$-signal produced by the circuit of FIGURE 8d is provided solely so that the auxiliary store of the counter stage of the lowest order is constituted by circuitry similar to that of the auxiliary stores of the higher-order counter stages. The circuit shown in FIGURE 8d comprises two input AND-circuits whose outputs are connected to an OR/NOT-circuit. One of the AND-circuits has applied to it the negate of a counting command signal $z$ by means of which the counter is made to count (when $z=L$) or not to count (when $z=0$). (The single input AND-circuit just referred to, as well as other single-input logic circuits which are part of circuitry referred to throughout the following description, are provided for purposes of electrical symmetry.) The other AND-circuit has applied to it the signals $A_0$ and $t_2$. The signal $z_1$ is derived from the $z$-signal, which may appear at any time, and a signal $z_2$ is derived from the signal $z_1$, such that $z_2$ can change its state only at the start of an auxiliary counting signal $t_2$, as explained in the mentioned application Ser. No. 327,585. The signal $z_2$ serves as a clear-for-counting signal, i.e., the $t_1$-signals are counted only so long as $z_2=L$. So long as $z_2=0$, the counter remains at whatever count it has reached. The counter can be preset to any desired starting number by means of preset signals $k$, the same being identified by subscripts and superscripts in a manner analogous to that in which the A and H signals are identified, as explained above. The $k$-signals are accepted by the counter when a clear-for-presetting signal $f=L$. Since the $f$-signal disappears at the start of the counting operation, a new number to which the counter may later be preset can be made ready during the counting operation. If no presetting is required, the means by which the presetting is accomplished can be dispensed with.

It is the object of the present invention to provide a static counter which produces signals at a preselected count. These signals are to be formed either only once or periodically. A "one-time preselection" means that the counter is stopped after these signals have appeared, while a "periodic preselection" means that the counter begins a new counting operation immediately after having formed these signals. In the case of non-presettable counters, the count begins at 1, while in the case of presettable counters, the count begins with the number $k+1$ which follows the preset starting number $k$. The signals which are formed are to be used, for example, to sort out or to suppress a signal from a sequence of signals.

With the above objects in view, the present invention resides in a static counter with preselection feature which is controlled by means of staggered counting and auxiliary counting signals, wherein a signal $C_1$ is derived, timely displaced, from a coincidence signal $\alpha$ which is present so long as the count of the counter coincides with a number to which a preselection register has been set, which signal $C_1$ appears when the coincidence signal $\alpha$ appears at the same time as an auxiliary counting signal is present, this signal $C_1$ being used for resetting the counter and/or for interrupting the counting operation.

According to a further feature of the present invention, the signal $C_1$ is formed by means of a store which is set by means of an auxiliary counting signal when a coincidence signal is present. In practice, this store is erased after the disappearance of the coincidence signal or upon the appearance of the auxiliary counting signal which follows the auxiliary counting signal that was used for producing the signal $C_1$.

According to a further feature of the present invention, the signal $C_1$ is derived from the coincidence signal by means of an AND-stage. In practice, there is derived from the signal $C_1$ a signal $C_2$ which is timely displaced with respect to the signal $C_1$, which signal $C_2$ appears, when there is a signal $C_1$ present, upon the appearance of a counting signal and is used for erasing.

According to a further feature of the present invention, a store is used for forming the signal $C_2$, which store holds the signal $C_2$ beyond the time during which signal $C_1$ and the counting signal appear simultaneously. In practice, the signal $C_2$ is erased after the disappearance of the signal $C_1$.

According to a still further feature of the present invention, the store for forming the signal $C_1$ operates in accordance with the following logic function:

$$(\alpha \& t_2 \& \overline{C}_2 \& \overline{1}_B) v (C_1 \& \alpha \& \overline{C}_2 \& \overline{1}_B) v (C_1 \& \overline{t}_2 \& \overline{1}_B) = C_1$$

In practice, the store for forming the signal $C_2$ operates in accordance with the following logic function:

$$(C_1 \& t_1 \& \overline{1}_B) v (C_2 \& C_1 \& \overline{1}_B) v (C_2 \& \overline{t}_1 \& \overline{1}_B) = C_2$$

According to yet another feature of the present invention, where a one-time preselection is desired, i.e., wherein the preselected count is to be retained or where the erasing is to occur automatically, at least one store is provided which is influenced by the signal $C_1$ or $C_2$ and which produces a blocking or reset signal. In practice, this is done by producing in the store a signal $C_3$ which appears after the appearance of the signal $C_1$ and which is held until a reset signal $1_B$ appears.

According to a still further feature of the invention, there is formed in the store a signal $z$ which appears at any desired instant, which signal $z$ causes the counter to be cleared for counting and which is erased upon or subsequent to the appearance of the signal $C_1$. In practice, the store for producing the signal $C_3$ operates in accordance with the following logic function:

$$(C_2 \& \overline{1}_B) v (C_3 \& \overline{1}_B) = C_3$$

In accordance with a still further feature of the present invention, the store for producing the signal $z$ operates in accordance with the following logic function:

$$(z_e \& \overline{z}_a \& \overline{1}_B) v (z \& \overline{z}_a \& \overline{1}_B \& \overline{C}_1) = z$$

In practice, the signals $C_1$, $C_2$ are limited in duration by means of a signal $C_0$ which appears together with an operational erase signal $1_B$ which itself appears at any desired instant, and which signal $C_0$ disappears during the $C_1$ signal.

According to another feature of the present invention, where a periodic preselection is desired, a periodically appearing erase signal I is formed which appears timely displaced with respect to the coincidence signal. In practice, the periodically appearing erase signal is derived from the signal $C_1$ and/or the signal $C_2$.

According to another feature of the present invention, the coincidence signal $\alpha$ is formed in an output stage (AND) which is controlled by, via selectable circuit paths, the signals A which represent the count. In practice, the output stage (OR/NOT) which puts out the coincidence signal $\alpha$ has logic input stages (AND) connected ahead of it, which input stages have applied to them, in parallel, the signals $w$ that represent the preselected number and the signals A representing the count.

According to another feature of the present invention, the coincidence element comprises a plurality of parallelly controlled individual coincidence elements, whose results are combined in an output stage to which the outputs of the individual coincidence elements are applied. In practice, presetting means are provided for setting a starting number $k$, and this number is taken over by the counter, prior to the start of the counting operation, upon the appearance of a clear-for-presetting signal $f$.

According to another feature of the present invention, a periodically appearing clear-for-presetting signal is derived from the signals C, for purposes of periodic preselection, after the periodically appearing reset signal. In practice, the signals $C_1$ and/or the signals $C_2$ are used for sorting out or suppressing preselected signals out of the sequence of the counting signals and/or auxiliary counting signals.

Additional objects and advantages of the present invention will become apparent upon consideration of the following description when taken in conjunction with the accompanying drawings in which:

FIGURE 1a, already referred to above, is a schematic circuit diagram showing the first four stages of a binary counter.

FIGURE 1b, also referred to above, is a schematic circuit diagram showing the first four stages constituting the 0$^{\text{th}}$ decade of a decimal counter.

FIGURES 2a, 2b, 2c and 2d, also referred to above, are time plots showing the relationship between the counting signals $t_1$ and the auxiliary counting signals $t_2$.

FIGURES 8a, 8b, 8c and 8d, also referred to above, are, respectively, schematic diagrams of circuits for producing the signals $t_1$, $\bar{t}_1'$, $t_2'$ and $e$.

Figures 9A, 9B:
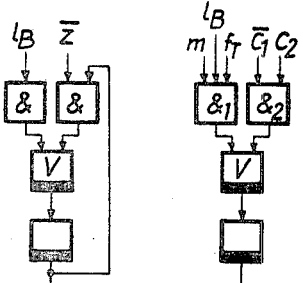
Figures 8A, 8B, 8C, 8D:
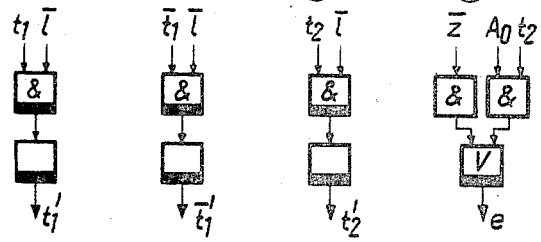

FIGURES 9a and 9b are, respectively, schematic diagrams of circuits for producing the signals $m$ and $f$.

FIGURES 10a, 10b and 10c are, respectively, schematic diagrams of circuits for producing the signals $z$, $z_1$ and $z_2$.

FIGURES 11a, 11b and 11c are, respectively, schematic diagrams of circuits for producing the signals $C_1$, $C_2$ and 1 at a selected instant.

FIGURES 12a, 12b, 12c and 12d are, respectively, schematic diagrams of circuits for producing the signals $\sigma_1$, $\sigma_2$, $\rho_1$ and $\rho_2$.

FIGURES 12a and 12f are, respectively, schematic diagrams of modified circuits for producing the signals $\rho_1$ and $\rho_2$.

FIGURE 13 is a schematic diagram of a modified circuit for producing the signal $f$.

FIGURES 14a, 14b and 14c are, respectively, modified circuits for producing the signals $z$, $z_1$ and $z_2$.

FIGURE 15a is a schematic diagram of a circuit for producing the signal $C_0$.

FIGURE 15b is a schematic diagram of a modified circuit for producing the signal $C_1$.

FIGURE 15c is a schematic diagram of a circuit for producing the signal $C_3$.

FIGURE 16 is a basic block diagram of a counting arrangement according to the present invention.

In each of the various circuit diagrams, the AND-circuits are identified by "&" (in some cases with subscripts) and the OR-circuits by "v," and in each case the black bar represents the presence of an inverse or complement, i.e., a negated, output. Various ones of the circuits also include pure inverter or so-called NOT-circuits, these being circuits at which the output is the inverse, that is to say, the negate, or complement, of the input, namely, 0 when the input is L, and L when the input is 0.

In the time plots, only the affirmative signals are shown, in the interests of simplicity and clarity. That is to say that, for example, only the signals $t_1$ but not the negates $\bar{t}_1$ thereof, are shown. Also, the signals are shown as having a rectangular wave form although in practice the wave form need not, as explained above, necessarily be square. As a matter of expediency, the abscissa of each signal represents the value 0 while the lines overlying the abscissa represent the binary "one" or L.

The count of the counter, as represented by the A-signals, is written into the time plots where applicable.

Figure 3:
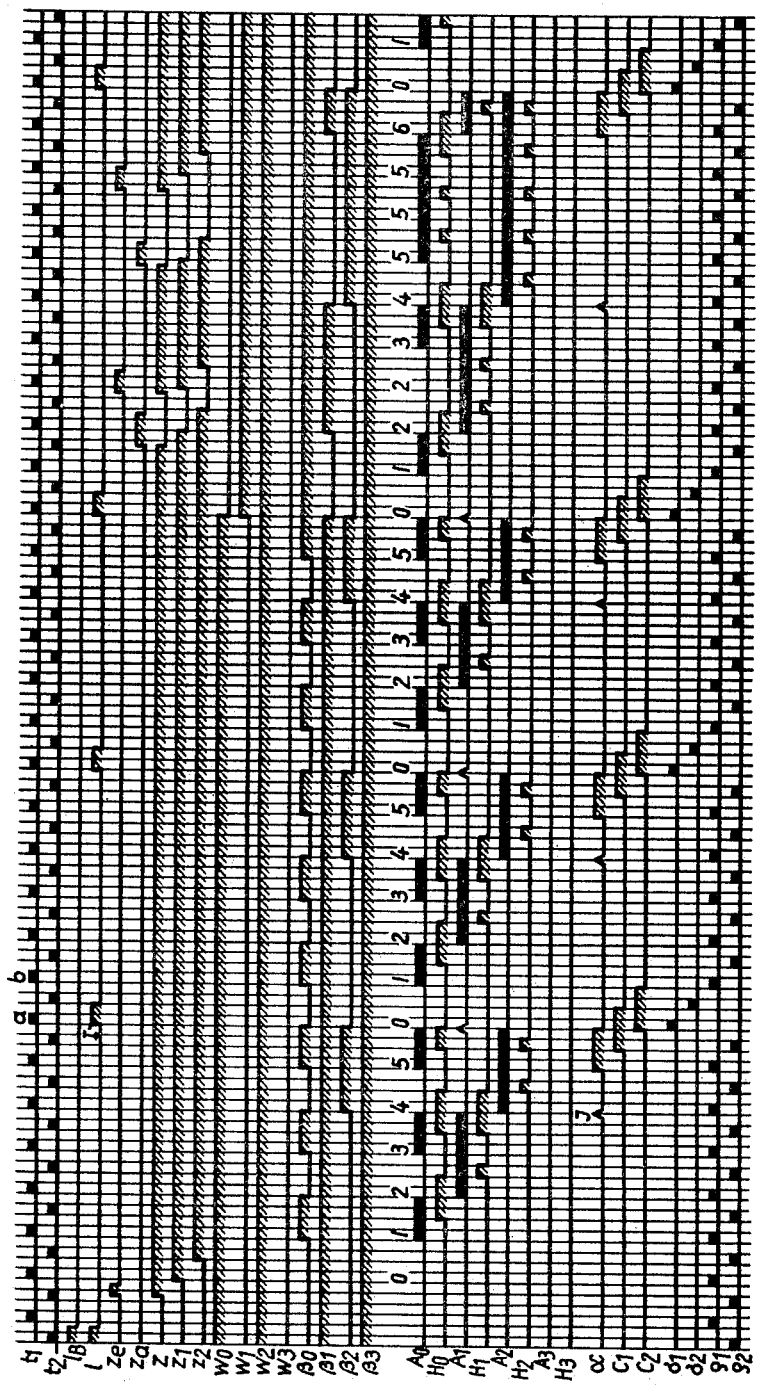
FIGURE 3 is a time plot showing the timed relationship between the various signals used in accordance with the present invention, in a binary counter as shown in FIGURE 1a, the operation being periodic.

Referring now once again to the drawings, FIGURE 3 is a time plot showing the relationship between the signals for periodic preselection in the case of a binary counter as shown in FIGURE 1a, i.e., a binary counter with four stages, in which the input stages for the presetting, namely, the AND-circuits to which the signals $k$ and $f$ are applied, may be dispensed with. The A-stores and H-stores of the counter stages are reset by means of the reset signal $1=L$. The reset signal 1 appears at the start of an operational reset signal $1_B$, which may be applied to the counter at any desired instant, for example by means of a suitable keying device.

The counting command signal $z$ may appear and disappear at any desired instants. It can, for example, be produced by means of a switch or in a store such as is shown in FIGURE 10a, the latter comprising two input AND-stages whose outputs are connected to an OR/NOT/NOT-circuit. The store is set by means of a signal $z_e=L$, and is erased by means of a signal $z_a=L$ ($\bar{z}_a=0$) and a signal $1_B=L$ ($\bar{1}_B=0$). The signals $z_e$, $z_a$, may be triggered, for example, by means of keys. The signal $z$ put out by the store of FIGURE 10a is used to derive the signals $z_1$, $z_2$, already referred to above, by means of the stores 10b and 10c, each of which has three input AND-circuits whose outputs are connected to an OR/NOT/NOT-circuit.

The count at which the counter is to form signals that are to be processed is set in a preselection register. The preselection register may be constituted, for example, by a group of storage elements or switches which put out the signals $w$. For purposes of illustration, as depicted in the time plot of FIGURE 3, it will be assumed that the preselected number is 5. (The subscripts carried by the signals $w$ represent the order, in a manner analogous to that described in conjunction with the A-signals.)

The counter starts to count from 1, with the first counting signal $t_1$ that appears after the clear-for-counting signal $z_2=L$. The coincidence signal $\alpha$ appears when the count of the counter, i.e., the A-signals, is the same as the preselected value, i.e., the w-signals.

Figure 7A:
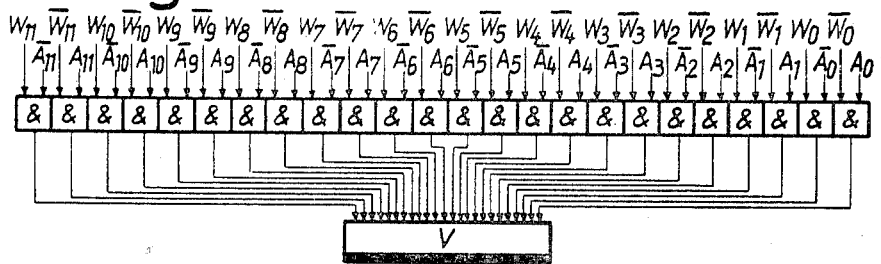
FIGURES 7a, 7b and 7c are, respectively, schematic diagrams of three embodiments of circuits for producing the coincidence signal $\alpha$.

There will now be described coincidence elements for producing the $\alpha$-signals when numbers having, for example, 12 bits are compared. The coincidence element of FIGURE 7a comprises twenty-four input AND-circuits whose outputs are connected to an OR/NOT-circuit. If, for one bit, $w_i$ is not equal to $A_i$, i.e., if $w_i=0$ and $A_i=L$, or $w_i=L$ and $A_i=0$, the output of the AND-circuit with the inputs $\bar{w}_i$, $A_i$, or $w_i$, $\bar{A}_i$, is equal to L as a result of which the output $\alpha$ the OR/NOT-circuit is equal to 0. Only if all $A_i=w_i$ will the outputs of all of the AND-circuits be equal to 0 and $\alpha$ be equal to L.

Figure 7B:
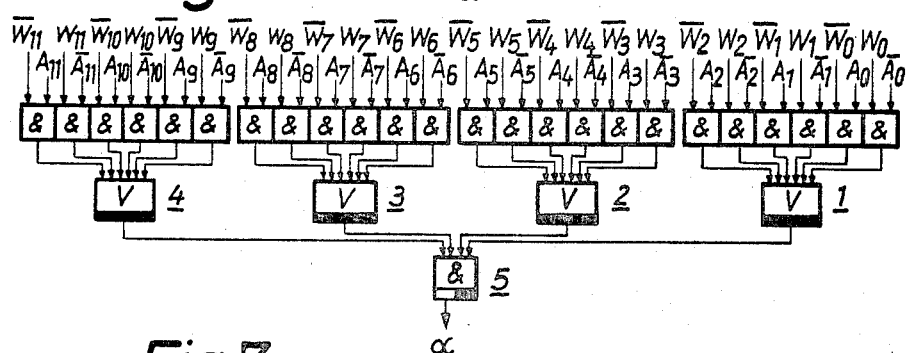

FIGURE 7b shows how the input stages of the coincidence element can be combined into groups 1, 2, 3, 4, if, for purposes of circuit considerations, the number of AND-circuits which can be connected ahead of any one OR/NOT-circuit is limited. The outputs of the four groups are connected to an AND/NOT/NOT-circuit 5.

Figure 7C:
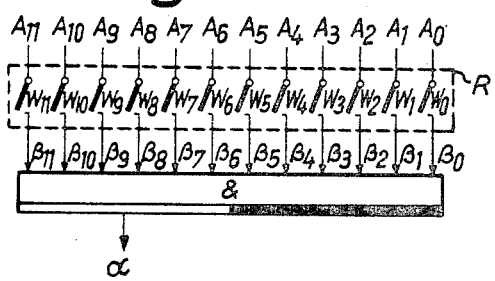

FIGURE 7c shows a simplified coincidence element which comprises but a single AND/NOT/NOT-circuit and a preselection register R in the form of switches. An open switch corresponds to the signal $w=0$, while a closed switch represents the signal $w=L$. If $w_i=0$ (switch open), the corresponding input signal $\beta_i$ of the coincident element is equal to L inasmuch as an open switch causes the corresponding input of the AND-circuit to be open and an open input acts as an L signal; if $w_i=L$ (switch closed), $\beta_i=A_i$ because, if the switch is closed, the $A_i$ signal applied to the AND-circuit is passed therethrough. The output signal $\alpha$ appears when all of the signals $\beta_i=L$, that is to say, at the same instants as the output signals of the above-described coincidence elements. The $\beta$-signals are also shown in the time plot of FIGURE 3. In the numerical example depicted by FIGURE 3, the coincidence element $\alpha$ is equal to L while the count is 5. As indicated by the short pulse J, a spurious signal L may appear at the output $\alpha$ of the coincidence element already at a time when the count is only 0L00 (4), if, for example, the end of the $A_0$-signal overlaps to a certain extent with the start of the $A_2$-signal. According to the present invention, however, such a pulse—should one appear—has no influence on the formation of the desired signals, as will be explained below.

The coincidence signal $\alpha$ is used for forming the signals C which are time-shifted with respect to the $\alpha$-signal. The C-signals can be used for resetting and interrupting the counter at a predetermined count as well as for sorting out or suppressing signals out for the sequence of $t$-signals.

A $C_1$-signal appears upon the appearance of an auxiliary counting signal $t_2$, while $\alpha=L$, and disappears with the succeeding $t_2$-signal. If a pulse J of short duration happens to be present, the same will have no effect on the formation of the $C_1$-signal because at the time such pulse J appears, there is no $t_2$-signal present which is needed for setting the $C_1$-store. A $C_2$-signal appears upon the appearance of a counting signal $t_1$ while $C_1=L$, and disappears with the succeeding $t_1$-signal.

The C-signals can be formed in stores, such as are shown in FIGURES 11$a$ and 11$b$, each of which stores comprises input AND-circuits whose outputs are connected to OR/NOT/NOT-circuits. A $C_1$-signal is formed in the store of FIGURE 11$a$ when all of the input signals of the setting stage $\&_1$ (this being an input stage which has no output signal fed back to it) are equal to L, i.e., when $\alpha=t_2=L$ and $C_2=1_B=0$, and—after $C_1=L$—is held when all of the input signals of one of the holding stages $\&_2$ and $\&_3$ (these being input stages to which the output signal is fed back) are equal to L, i.e., when $\alpha=L$ and $C_2=1_B=0$ (stage $\&_2$) or when $t_2=1_B=0$ (stage $\&_3$). A $C_2$-signal is set in the store of FIGURE 11$b$ when all of the input signals applied to the setting stage $\&_1$ are equal to L, i.e., when $C_1=t_1=L$ and $1_B=0$, and is held at L when all of the signals applied to one of the two holding stages $\&_2$ and $\&_3$ are L, i.e., when $C_1=L$ and $1_B=0$ (stage $\&_1$) or when $t_1=1_B=0$ (stage $\&_3$).

If, in addition to the $\beta$-signals, the negated signal $\overline{C}_2$ is applied as an input signal to the coincidence element of FIGURE 7$c$, the two inputs for $\overline{C}_2$ shown as being applied to the $C_1$-store of FIGURE 11$a$ can be dispensed with.

The C-signals can be used for forming the signal $\delta$, the signals $\delta_1$ and $\delta_2$ being formed, for example, by means of the circuits shown in FIGURES 12$a$ and 12$b$, respectively, each of which comprises an AND/NOT/NOT-circuit, the double NOT function being provided for purposes of circuit symmetry. The store of FIGURE 12$a$ has applied to it the signals $t_1$ and $C_1$, while the store of FIGURE 12$b$ has applied to it the signals $t_2$ and $C_2$.

Instead of sorting out a signal $\delta$ upon the appearance of the C-signals, a signal can here be suppressed from the sequence of $t$-signals. The resulting sequence of $\rho_1$-signals and $\rho_2$-signals are provided by means of the AND/NOT/NOT-circuits of FIGURES 12$c$ and 12$d$, respectively, the former having the signals $t_1$ and $\overline{C}_1$ and the latter the signals $t_2$ and $\overline{C}_2$ applied thereto. If the $\rho$-signals are to be produced only during the counting operation, i.e., when $z_2=L$, the circuits of FIGURES 12$c$ and 12$d$ may be modified, as shown in FIGURES 12$e$ and 12$f$, respectively, so as to have the $z_2$-signal applied as an additional input signal to the respective AND-circuits.

The C-signals are also used for erasing the count. In the example depicted by FIGURE 3, a new erase or reset signal $1=L$ (signal I in FIGURE 3) occurs at a preselected instant, namely, when $C_1=C_2=L$. The requisite negated reset signal $\overline{1}$ is produced in a circuit such as is shown in FIGURE 11$c$. $\overline{1}$ becomes equal to 0 ($1=L$), at any desired instants, e.g., before a counting operation, when $1_B$ is made equal to L, and at preselected instants when $C_1=C_2=L$. The count is erased upon the appearance of the preselected erase signal $1=L$. (In the example under consideration, the $C_2$-signal or the $\delta_1$-signal can be used as a preselect erase signal.) The counter is reset at the instant of the $t_1$-signal (a) at which the counter would—were there no preselection means—change from 0L0L (5) to 0LL0 (6). With the next counting signal $t_1$ (b)— that is to say, after the disappearance of the reset signal—the counter again begins to count starting from 000L (1) until, when the counter once more reaches 0L0L (5), the signal $C_1$ is produced from the coincidence signal $\alpha$, and so on. The right-hand portion of the time plot of FIGURE 3 shows the preselected number to be equal to 6, and shows two interruptions of the count ($z_2=0$).

Figure 4:
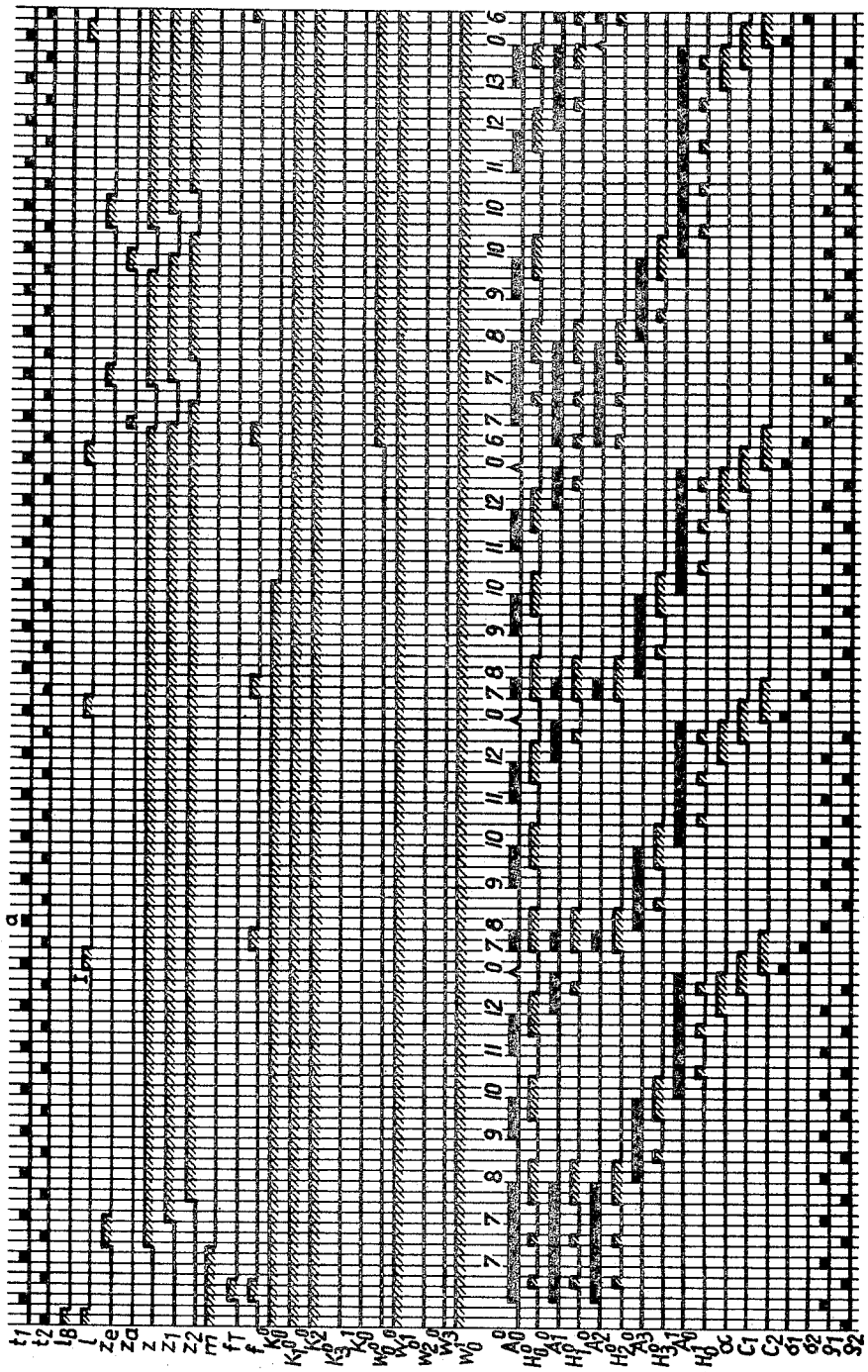
FIGURE 4 is a time plot showing the timed relationship between the various signals used in accordance with the present invention in a decimal counter as shown in FIGURE 1b, the operation being periodic.

FIGURE 4 is a time plot showing the relationship between the signals for periodic resetting in the case of a presettable decimal counter, such as is shown in FIGURE 1$b$. The k-signals are used to enable the counter to be preset to a starting number 7. When the reset signal $1_B=L$, there is produced a signal $m$ which is produced in a store such as is shown in FIGURE 9$a$. This signal $m$ disappears upon the appearance of the counting command signal $z=L$. If, while $m=L$ and $1_B=0$, there appears a signal $f_T=L$, produced, for example, by means of a presetting key, there appears the clear-for-presetting signal $f$. The key which triggers the signal $f_T$ can be dispensed with, in which case there will appear that portion of the clear-for-presetting signal which occurs prior to the counting so long as $m=\overline{1}_B=L$. The $f$-signal is also produced at further preselected instants. When $f=L$, the k-signals are taken over by the counter. The significance of the other signals shown in the time plot has already been explained.

After the clear-for-counting signal $z_2=L$, the counter continues to count from the preset starting number (7) on to 8, and so on, until there appears the coincidence signal $\alpha$ when the count has reached the preselected value (12, in the instant example) to which the counter has been set by means of the w-signals. As in the case of the binary counter, explained in conjunction with the time plot of FIGURE 3, here, too, $C_1$, $C_2$ signals are produced, and from them the reset signal 1. The count is erased when $1=L$, after which the counter is once more preset to the starting number (7) by means of the k-signals, when, following the 1-signal, there is a new clear-for-presetting signal $f$. The counter then continues to count to 8, upon the appearance of the next counting signal $t_1$ (a), and so on.

FIGURE 9$b$ shows how the $f$-signal is formed. The part of the f-signals appearing at the beginning is controlled by the AND-circuit $\&_1$ to which are applied the signals $m$, $\overline{1}_B$ and $f_T$, while that part of the $f$-signals which appears at the preselected instants is produced by the other AND-circuit $\&_2$ to which the signals $\overline{C}_1$ and $C_2$ are applied.

The right portion of FIGURE 4 shows the presetting signals $k$ as having preset the counter to 6 and the preselecting signals $w$ as having preselected the number 13. Interruptions in the counting operation are represented by $z_2=0$.

The following are the logic functions of the various circuits for periodic preselection.

*Signals introduced for the purposes of simplifying the counter stages of the counter*

$$t_1\&\overline{1}=t_1' \quad (\text{FIG 8}a)$$

$$\overline{t}_1\&\overline{1}=\overline{t}_1' \quad (\text{FIG. 8}b)$$

$$t_2\&\overline{1}=t_2' \quad (\text{FIG. 8}c)$$

$$\overline{z}_2v(A_0\&t_2)=\overline{e} \quad (\text{FIG. 8}d)$$

*Additional signals needed if the count is to be interruptable at will*

$$(z_e\&\overline{z}_a\&\overline{1}_B)v(z\&\overline{z}_a\&\overline{1}_B)=z \quad (\text{FIG. 10}a)$$

$$(z\&t_1\&\overline{1}_B)v(z_1\&z\&\overline{1}_B)v(z_1\&\overline{t}_1\&\overline{1}_B)=z_1 \quad (\text{FIG. 10}b)$$

$$(z_1\&t_2\&\overline{1}_B)v(z_2\&z_1\&\overline{1}_B)v(z_2\&\overline{t}_2\&\overline{1}_B)=z_2 \quad (\text{FIG. 10}c)$$

*Signals required for presetting a starting number*

$$1_Bv(m\&\overline{z})=m \quad (\text{FIG. 9}a)$$

$$(m\&\overline{1}_B\&f_T)v(\overline{C}_1\&C_2)=f \quad (\text{FIG. 9}b)$$

*Coincidence signal*

$$(w_0 \& \overline{A}_0) v (\overline{w}_0 \& A_0) v (w_1 \& \overline{A}_1) v (\overline{w}_1 \& A_1) v \ldots$$
$$v(w_n \& \overline{A}_n) v (\overline{w}_n \& A_n) = \alpha \quad \text{(FIG. 7a)}$$

$$\beta_0 \& \beta_1 \& \beta_2 \& \ldots \& \beta_n = \alpha \quad \text{(FIG. 7c)}$$

with $$\beta_i = L \text{ for } w_i = 0$$

and $$\beta_i = A_i \text{ for } w_i = L$$

*Signals C appearing after $\alpha = L$*

$$(\alpha \& t_2 \& \overline{C}_2 \& \overline{1}_B) v (C_1 \& \alpha \& \overline{C}_2 \& \overline{1}_B) v (C_1 \& \overline{t}_2 \& \overline{1}_B) = C_1 \quad \text{(FIG. 11a)}$$

$$(C_1 \& t_1 \& \overline{1}_B) v (C_2 \& C_1 \& \overline{1}_B) v (C_2 \& \overline{t}_1 \& \overline{1}_B) = C_2 \quad \text{(FIG. 11b)}$$

*Reset signal for the counter*

$$1_B v (C_1 \& C_2) = 1 \quad \text{(FIG. 11c)}$$

*Output circuits for sorting out signals*

$$t_1 \& C_1 = \delta_1 \quad \text{(FIG. 12a)}$$

$$t_2 \& C_2 = \delta_2 \quad \text{(FIG. 12b)}$$

*Output circuits for suppressing signals*

$$t_1 \& \overline{C}_1 = \rho_1 \quad \text{(FIG. 12c)}$$

$$t_2 \& \overline{C}_2 = \rho_2 \quad \text{(FIG. 12d)}$$

$$t_1 \& \overline{C}_1 \& z_2 = \rho_1 \quad \text{(FIG. 12e)}$$

$$t_1 \& \overline{C}_2 \& z_2 = \rho_2 \quad \text{(FIG. 12f)}$$

Figure 1B:
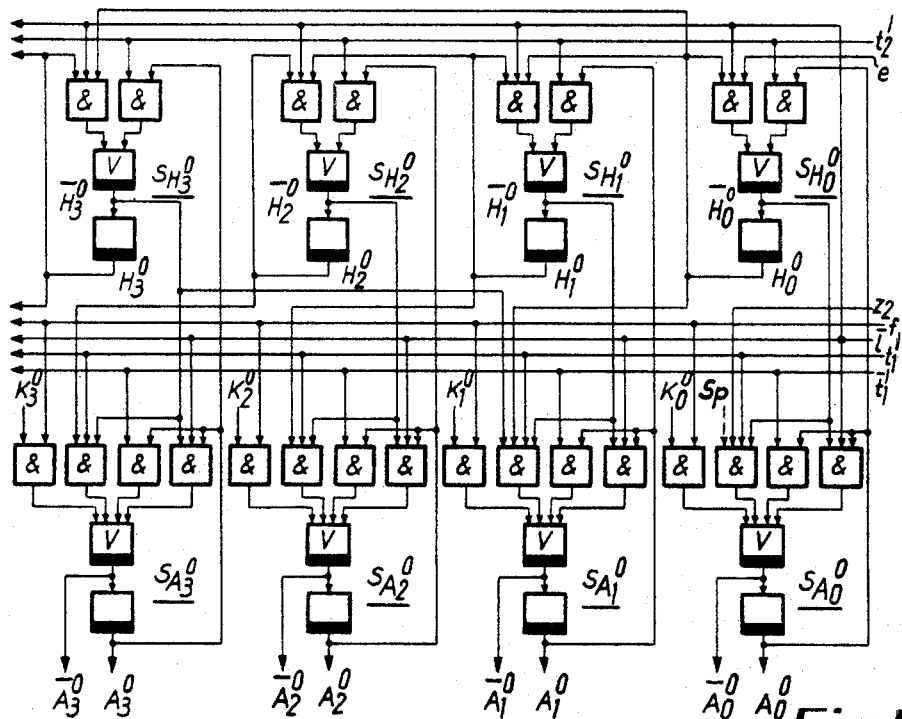
Figure 2A:
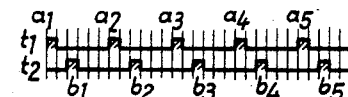
Figure 2B:
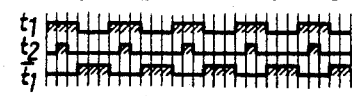
Figure 2C:
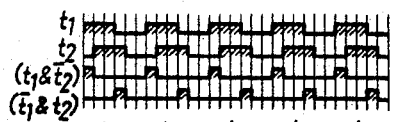
Figure 2D:
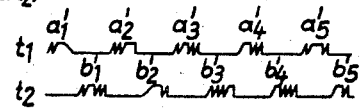
Figure 5B:
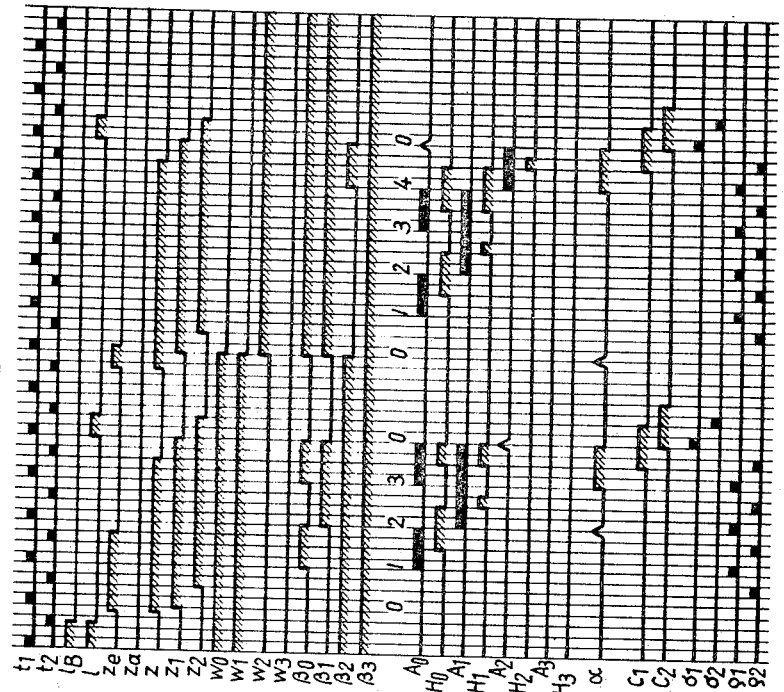
FIGURES 5a, 5b and 5c are time plots showing the timed relationship between the various signals used in accordance with the present invention, the operation being non-periodic or "one-time" and does not take any presetting into consideration.
Figure 5A:
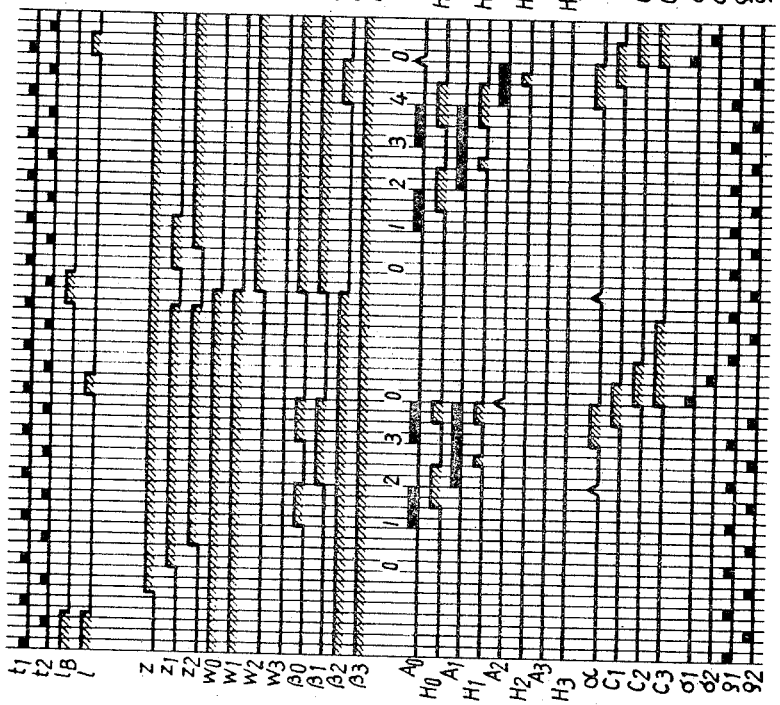
Figure 5C:
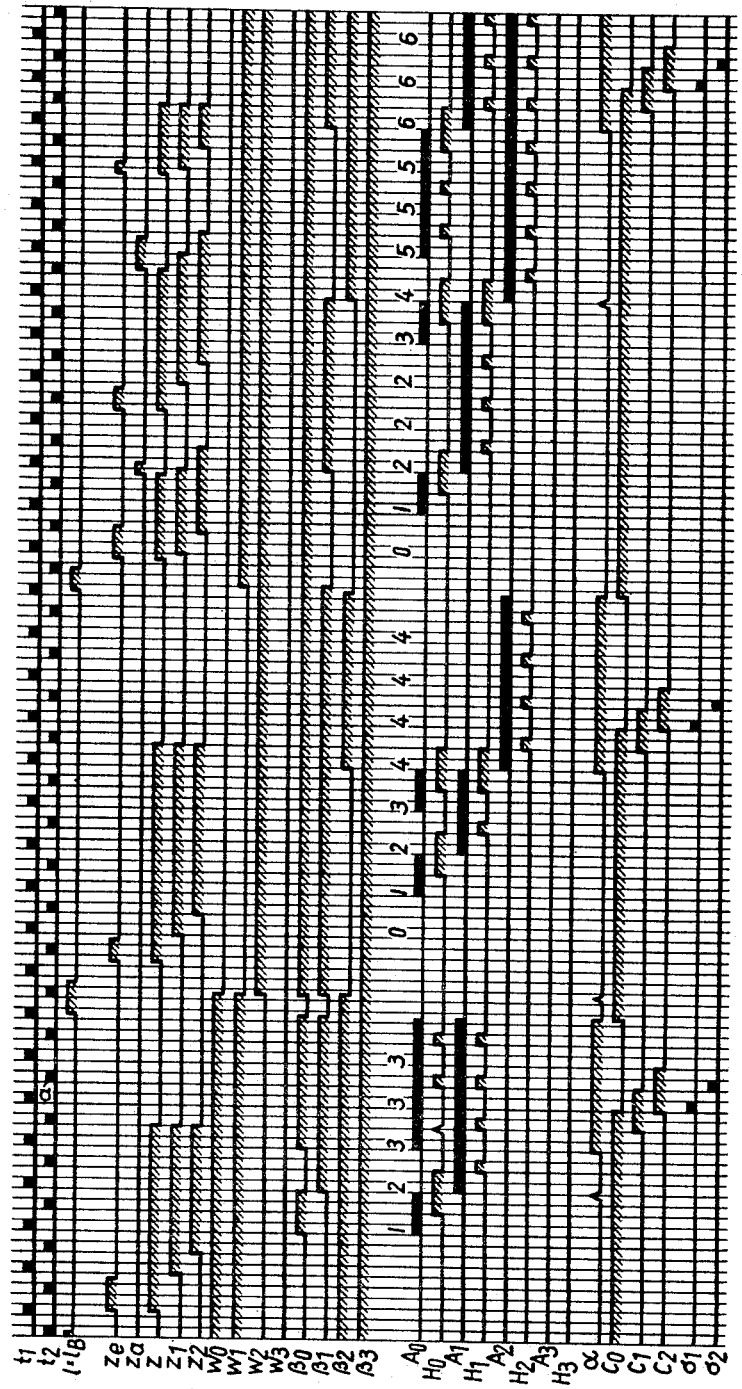
Figure 6:
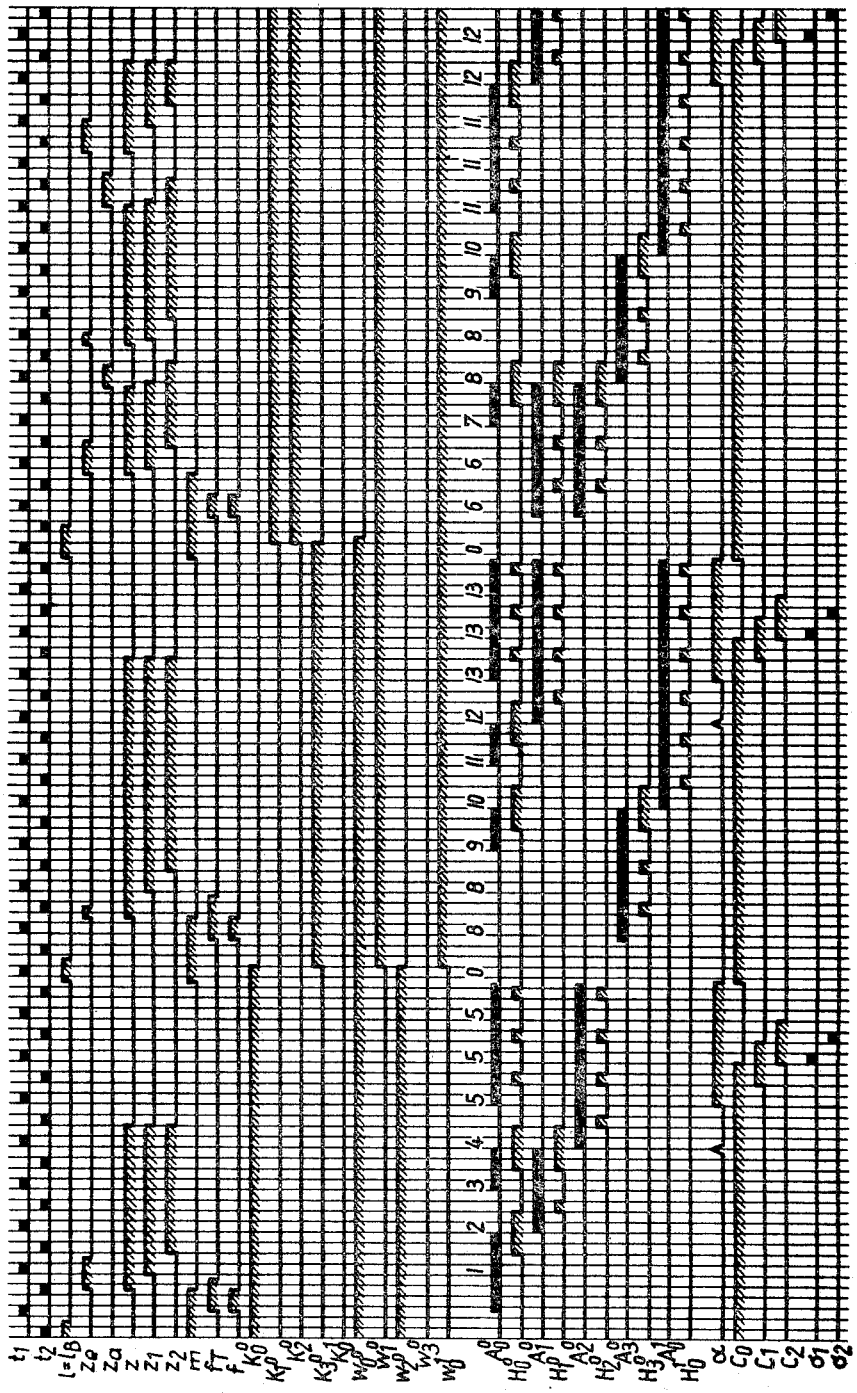
FIGURE 6 is a time plot showing the timed relationship between the various signals used in accordance with the present invention, the operation being non-periodic or "one-time" and taking a presetting into consideration.

If, instead of producing the C-signals as well as the signals $\delta$ and $\rho$ periodically—as depicted in the time plots of FIGURES 3 and 4—these signals are to be produced but once, the present invention can be modified accordingly, namely, as shown in the time plots of FIGURES 5a, 5b, 5c, which relate to the four counter stages of the counter of FIGURE 1a, or as shown in the time plot of FIGURE 6, which relates to the 0th decade of a counter according to FIGURE 1b. The various signals are identified by the same references as before.

FIGURE 5 shows a one-time preselection of 3, then of 4. The signals $\alpha$, $C_1$, $C_2$, 1, $\delta_1$, $\delta_2$, $\rho_1$, $\rho_2$, are formed in the same manner as during periodic preselection (FIGURE 3). At the instant at which the signal $C_2$ appears, a further signal $C_3$ is formed, which disappears only upon the appearance of a new reset signal $1_B = L$. The $C_3$-signal is applied as a blocking signal to the input $S_p$ of the main store of the counter stage of the lowest order, this input being shown, in FIGURES 1a and 1b, in dashed lines. This signal prevents renewed counting before the $C_3$ has been made to disappear by a reset signal $1_B = L$. The $C_3$-signal is formed in a store such as is shown in FIGURE 15c.

If, as has been assumed for the time plot of FIGURE 5b, there is a store for the counting command signal $z$, the signal $C_3$ can be dispensed with. All that is necessary is that the negated signal $\overline{C}_2$ be applied to the z-store as an additional erase signal, so that the counting will be interrupted in this way, too. The counting can be resumed only after the z-store has once more been set, for example by means of a signal $z_e$ which itself can be triggered by operating a key. FIGURE 14a shows such a store, modified with respect to that of FIGURE 10a. Here, the $\rho$-signals, in contradistinction to the time plots so far described, will be formed by means of circuits shown in FIGURES 12e and 12f, so that they can appear only when $z_2 = L$.

The time plots of FIGURES 5a and 5b show that after the counter has reached the preselected count, it is reset and then blocked. For certain operations, it may be desired that, though the counter be blocked upon reaching the preselected value, it is not reset, i.e., that the count remain at the preselected count which it has reached.

This will be explained in conjunction with the time plot of FIGURE 5c, which contains the same signals as those depicted in FIGURE 5b, plus a signal $C_0$ which is formed within a store such as is shown in FIGURE 15a. The signal $C_0$ appears when $1_B = L$ and disappears when the signal $C_2$ becomes equal to L. As shown in FIGURE 15b, this signal $C_0$ is introduced into the store for forming the signal $C_1$, and causes the $C_1$-signal, as before, to disappear with the second auxiliary counting signal $t_2$ (a)—FIGURE 5c—after the coincidence signal $\alpha = L$. The $C_1$ signal can only reappear after $C_0 = L$. Thus, the count has to be erased by means of the reset signal $1_B = L$ and a new $C_0$-signal has to be produced. A new counting operation is then initiated by setting of the z-signal by means of the signal $z_e = L$. The time plot shows the preselection of 3, 4 and 6. In the last-mentioned case, a number of interruptions in the counting operation are shown. The circuits for producing the signals $z_1$ and $z_2$ are modified somewhat as compared to the circuits used for producing these signals for the one-time preselection of FIGURE 5b; as shown in FIGURES 14b and 14c, the negated signal $\overline{C}_1$ is additionally applied to the stores for forming the z-signals. The reset signal 1 is $1 = 1_B$.

The time plot of FIGURE 6 shows a one-time preselection, there being a preset starting number. Initially, the counter is preset to 1 and the preselected number is 5, in which case the $\delta_1$-signal, for example, will appear with the fifth $t_1$ signal after the clear-for-counting signal $z_2$ has become equal to L. For the next counting operation, the preset number is 8 and the preselected number is 13, while for the next count, the preset number is 6 and the preselected number is 12. The signals are formed in the manner described in conjunction with the time plot of FIGURE 5c. The signals needed for the presetting have been explained in conjunction with the time plot of FIGURE 4, only the circuit for forming the clear-for-presetting signal $f$ has been modified, as shown in FIGURE 13.

The following are those logic functions of the circuits used for controlling the counter for one-time preselection which differ from, or are in addition to, the functions and circuits used for periodic preselection.

*(a) If the counter, upon reaching the preselected count, is to be automatically reset*

If there is a z-store $$(z_e \& \overline{z}_a \& \overline{1}_B) v (z \& \overline{z}_a \& \overline{1}_B \& \overline{C}_1) = z \quad \text{(FIG. 14a)}$$

$$(C_2 \& \overline{1}_B) v (C_3 \& \overline{1}_B) = C_3 \quad \text{(FIG. 15c)}$$

If there is no z-store $C_3$ is applied as a blocking signal to the main store of the lowest order counter stage.

In conjunction with the unchanged $m$-signal, required only in case of presetting $$m \& \overline{1}_B \& f_T = f \quad \text{(FIG. 13)}$$

*(b) If the counter upon reaching the preselected count, is not to be reset automatically, but is to retain the count reached until reset.*

$$(z_e \& \overline{z}_a \& \overline{1}_B) v (z \& \overline{z}_a \& \overline{1}_B \& \overline{C}_1) = z \quad \text{(FIG. 14a)}$$

$$(z \& t_1 \& \overline{1}_B) v (z_1 \& z \& \overline{1}_B)$$
$$v (z_1 \& \overline{t}_1 \& \overline{1}_B \& \overline{C}_1) = z_1 \quad \text{(FIG. 14b)}$$
$$(z_1 \& t_2 \& \overline{1}_B) v (z_2 \& z_1 \& \overline{1}_B)$$
$$v (z_2 \& \overline{t}_2 \& \overline{1}_B \& \overline{C}_1) = z_2 \quad \text{(FIG. 14c)}$$

$$1_B v (C_0 \& \overline{C}_2) = \overline{C}_0 \quad \text{(FIG. 15a)}$$

$$(\alpha \& t_2 \& \overline{1}_B \& C_0) v (C_1 \& \alpha \& \overline{1}_B \& C_0)$$
$$v (C_1 \& \overline{t}_2 \& \overline{1}_B) = \overline{C}_1 \quad \text{(FIG. 15b)}$$

$$1_B = 1,$$

$$m \& \overline{1}_B \& f_T = f \quad \text{(FIG. 13)}$$

In summary, it will be seen that the present invention resides, basically, in a counting arrangement, as well as in a method of counting, such as is depicted, in its basic form, in FIGURE 16. The arrangement comprises the static counter 10 which is controlled by the timely staggered counting signals $t_1$ and the auxiliary counting signals $t_2$, as well as a preselection register 20 capable of receiving a preselected number. The coincidence means 30 are connected to the counter 10 and the register 20 and produce the coincidence signal $\alpha$ which is present so long as the count of the counter is the same as the preselected number written into the preselection register. The coincidence signal is applied to a further means 40, which also has applied to it the auxiliary counting signals $t_2$ and which produces the signal $C_1$ when both the coincidence signal and an auxiliary counting signal are present. This signal $C_1$ is effective to reset the counter and/or to interrupt the counting operation of the counter.

It will be understood that the above description of the present invention is susceptible to various modifications, changes and adaptations, and the same are intended to be comprehended within the meaning and range of equivalents of the appended claims.

What is claimed is:

1. A counting arrangement comprising, in combination:
   (a) a multiple-stage static counter each of whose stages has a main store and an auxiliary store, said main and auxiliary stores being controlled, respectively, by timely staggered counting signals $t_1$ and auxiliary counting signals $t_2$;
   (b) a preselection register capable of receiving a preselected number;
   (c) coincidence means connected to said static counter and to said preselection register for producing a coincidence signal $\alpha$ which is present so long as the count of said counter is the same as the preselected number written into said preselection register; and
   (d) means connected to said coincidence means for deriving from said coincidence means a timely displaced signal $C_1$ which appears when both said coincidence signal and an auxiliary counting signal $t_2$ are present, said signal $C_1$ being effective for carrying out at least one of the following functions: (1) resetting said counter, (2) interrupting the counting operation of said counter.

2. A counting arrangement as defined in claim 1 wherein said means (d) comprise a store and means for applying the auxiliary counting signal and said coincidence signal to said store for setting the same with an auxiliary counting signal while a coincidence signal is present.

3. A counting arrangement as defined in claim 2 wherein said means (d) further comprise means for erasing said store in response to one of the following: (1) disappearance of said coincidence signal, (2) the appearance of the auxiliary counting signal following the auxiliary counting signal which was used for producing said signal $C_1$.

4. A counting arrangement as defined in claim 1 wherein said means (d) comprise an AND-stage for deriving said signal $C_1$ frim said coincidence signal.

5. A counting arrangement as defined in claim 1 wherein said means (d) further comprise means for deriving from said signal $C_1$ a timely displaced signal $C_2$ which appears when both said signal $C_1$ and a counting signal $t_1$ appear, said signal $C_2$ being effective for resetting said counter.

6. A counting arrangement as defined in claim 5 wherein said means for producing said signal $C_2$ comprise a store which holds the signal $C_2$ beyond the time during which the signal $C_1$ and the counting signal appear simultaneously.

7. A counting arrangement as defined in claim 5 wherein said means for producing said signal $C_2$ further comprise means for erasing said signal $C_2$ after the disappearance of said signal $C_1$.

8. A counting arrangement as defined in claim 2 wherein said store for producing said signal $C_1$ has the following function:

$$(\alpha \& t_2 \& \overline{C}_2 \& \overline{1}_B) v (C_1 \& \alpha \& \overline{C}_2 \& \overline{1}_B) v (C_1 \& \overline{t}_2 \& \overline{1}_B) = C_1$$

where $1_B$ is an operational reset signal.

9. A counting arrangement as defined in claim 5 wherein said store for producing said signal $C_2$ has the following logic function:

$$(C_1 \& t_1 \& \overline{1}_B) v (C_2 \& C_1 \& \overline{1}_B) v (C_2 \& \overline{t}_1 \& \overline{1}_B) = C_2$$

wherein $1_B$ is an operational reset signal.

10. A counting arrangement as defined in claim 5 and intended for one-time preselection, wherein said means (d) comprise at least one store controlled by a signal $C_1$ or $C_2$ for producing a blocking or reset signal.

11. A counting arrangement as defined in claim 10 wherein said store includes means for producing a signal $C_3$ which appears after the appearance of a signal $C_1$ and is held until there appears an operational reset signal $1_B$.

12. A counting arrangement as defined in claim 10 wherein said store includes means for producing a signal $z$ which appears at any desired instant, which signal $z$ causes the counter to be cleared for counting and which is erased upon or subsequent to the appearance of the signal $C_1$.

13. A counting arrangement as defined in claim 11 wherein said store for producing said signal $C_3$ has the following logic function $$(C_2 \& \overline{1}_B) v (C_3 \& \overline{1}_B) = C_3$$

14. A counting arrangement as defined in claim 12 wherein said store for producing said signal $z$ has the following logic function $$(z_e \& \overline{z}_a \& \overline{1}_B) v (z \& \overline{z}_a \& \overline{1}_B \& \overline{C}_1) = z$$

15. A counting arrangement as defined in claim 5 wherein said means (d) comprise means for limiting the duration of the signals $C_1$, $C_2$, said limiting means comprising means for producing a signal $C_0$ which appears together with an operational reset signal $1_B$ which itself may appear at any desired instant, and which signal $C_0$ disappears during the $C_1$ signal.

16. A counting arrangement as defined in claim 5 and intended for periodic preselection, wherein said means (d) comprise means for periodically forming a reset signal I which is timely displaced with respect to said coincidence signal.

17. A counting arrangement as defined in claim 16 wherein said means (d) include means for deriving said periodically appearing reset signal I from one of the following: (1) the signals $C_1$, (2) the signals $C_2$, (3) the signals $C_1$ and $C_2$.

18. A counting arrangement as defined in claim 1 wherein said coincidence means (c) comprise an output AND-circuit which is controlled, via selectable circuit paths, by signals A representing the count of said counter.

19. A counting arrangement as defined in claim 1 wherein said coincidence means (c) comprise an output OR/NOT-circuit which puts out said coincidence signal, input AND-circuits connected to the inputs of said output OR/NOT-circuit, and means for applying to said input AND-circuits, in parallel, signals w representing the preselected number and signals A representing the count of said counter.

20. A counting arrangement as defined in claim 1 wherein said coincidence means (c) comprise a plurality of parallelly controlled individual coincidence elements, and an output stage to which the outputs of said individual coincidence elements are applied.

21. A counting arrangement as defined in claim 1 wherein said counter is equipped with presetting means for enabling said counter to be preset to a number, prior to the start of counting operation, upon the appearance of a clear-for-presetting signal $f$.

22. A counting arrangement as defined in claim 21, further comprising means for deriving a periodically appearing clear-for-resetting signal from said signal C, thereby to obtain periodic preselection after the periodically appearing reset signal.

23. A counting arrangement as defined in claim 5 wherein said signals $C_1$, $C_2$, are used sorting out or suppressing preselected signals out of the sequence of said signals $t_1$, $t_2$.

References Cited

UNITED STATES PATENTS 3,324,456   6/1967   Brown et al.

MAYNARD R. WILBUR, *Primary Examiner.*

G. J. MAIER, *Assistant Examiner.*